UNITED STATES PATENT OFFICE.

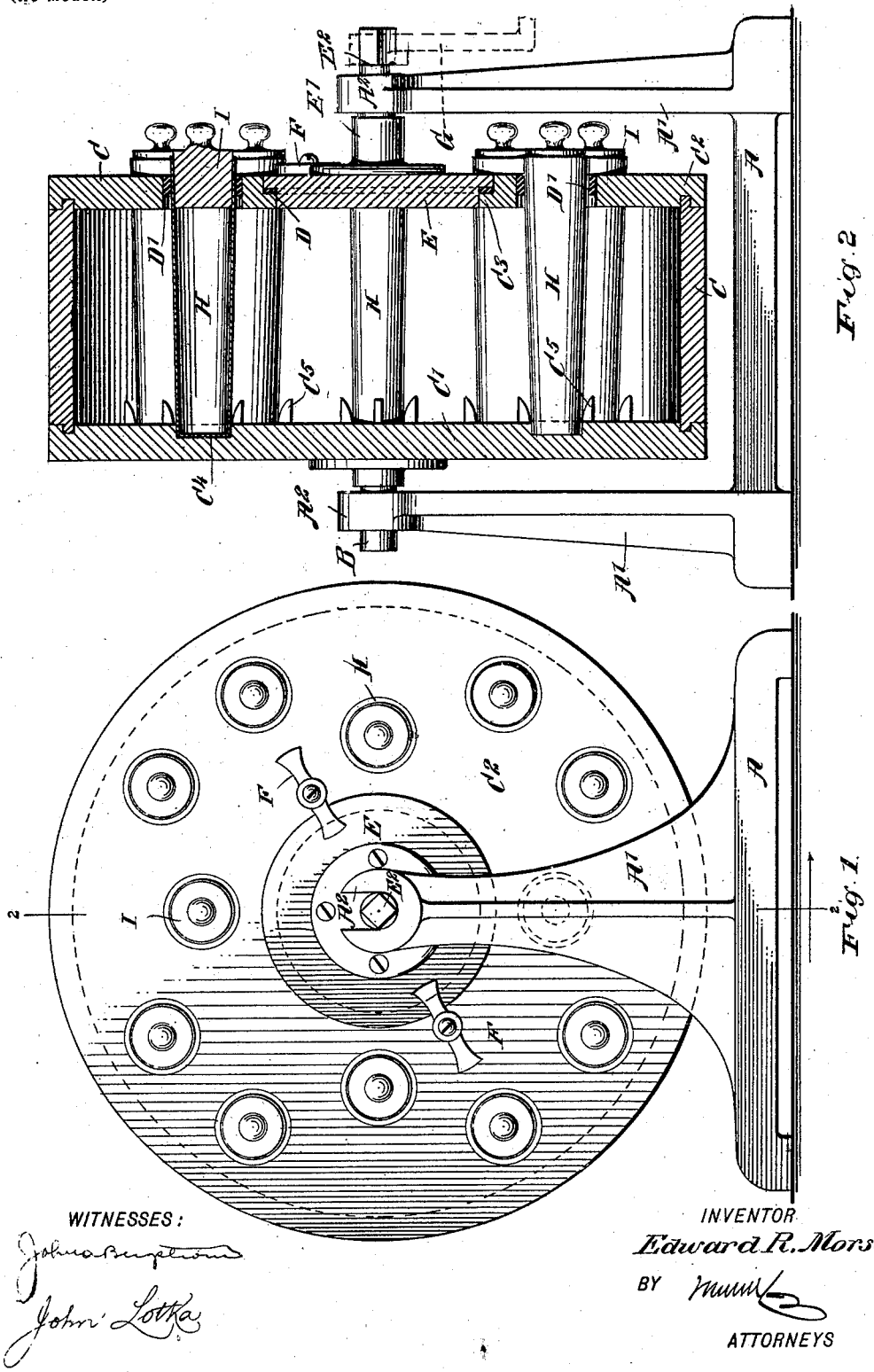

EDWARD RUSSELL MORSE, OF BIRMINGHAM, ALABAMA.

ICE-CREAM FREEZER.

SPECIFICATION forming part of Letters Patent No. 692,059, dated January 28, 1902.

Application filed April 18, 1901. Serial No. 56,405. (No model.)

*To all whom it may concern:*

Be it known that I, EDWARD RUSSELL MORSE, a citizen of the United States, and a resident of Birmingham, in the county of Jefferson and State of Alabama, have invented new and useful Improvements in Ice-Cream Freezers, of which the following is a full, clear, and exact description.

My invention relates to ice-cream freezers, and has for its object to provide a simple apparatus permitting of freezing ice-cream, either plain or fancy, in a short time and at a moderate expense, preventing contamination of the ice-cream by the freezing mixture and facilitating the insertion of the cream-receptacles and the removal of the ice-cream therefrom.

The invention will be fully described hereinafter and the features of novelty pointed out in the appended claims.

Reference is to be had to the accompanying drawings, forming a part of this specification, in which similar characters of reference indicate corresponding parts in both the figures.

Figure 1 is a face view of my improved ice-cream freezer, and Fig. 2 is an elevation thereof with parts in section on the line 2 2 of Fig. 1.

The freezer comprises a base A, with suitable standards A' rising therefrom, these standards carrying at their upper ends bearings $A^2$, preferably open at the top. In one of the said bearings is adapted to rest a journal B, projected from one end wall or head C' of the receptacle C. This receptacle may be round, as shown, or square or of any other shape desired. The other head $C^2$ of the receptacle has a central opening, with a shoulder formed by a flange $C^3$, against which is adapted to become seated a rubber gasket D, secured to the removable cover E, or the gasket may be secured to the receptacle. The cover E is adapted to be held in position by catches or turn-buttons F, pivoted to the head $C^2$. From the cover projects centrally outward a journal E' in alinement with the journal B and provided with an angular portion $E^2$, adapted to receive a crank G, or the crank may be secured permanently to the journal. The head $C^2$ is provided with a series of apertures at different distances from its center, said apertures having rubber linings D', and the head C' has on its inner surface in alinement with said apertures recesses $C^4$ of smaller dimensions than the corresponding apertures. Adjacent to the recesses may be located inwardly-projecting holders or lugs $C^5$. The said apertures and recesses are adapted to receive the vessels or cups H, adapted to contain the cream or other substance to be frozen. These cups are tapered toward their closed ends and are adapted to be closed by stoppers I, arranged to extend with their inner surfaces about flush with the inner surface of the head $C^2$. On the stoppers may be indicated the nature (flavor) of the cream to be frozen therein.

In operation to make plain ice-cream the cups H are filled, as usual, closed, and inserted into the receptacle C, the rubber linings D' holding them air and water tight. The cover E being removed, the lower part of the receptacle is filled with ice and salt. Then the cover is again put on, and the crank G is turned or rocked, so as to swing the receptacle first in one direction and then in the other. Owing to the fact that the cups H are at different distances from the center the ice will be thoroughly agitated, and in eight to ten minutes the ice-cream will be found to be thoroughly frozen. The cups may then be removed individually, and by holding a cloth dipped in hot water against the outer surface of the cup the ice-cream will be caused to fall out through the open end of the cup. This is facilitated by the tapering shape of the cup, which also insures a tight fit of the rubber linings D'.

To make fancy ice-cream, the cup is at first filled only partly—say about one-third—with cream of one flavor, say lemon. Under constant rocking of the receptacle C this cream will first form a thin frozen lining on the inside of the cup, and when all the cream of this flavor is frozen it will leave a free space in the center. I then place the machine so that the head C' will stand horizontal and will form the bottom of the receptacle, and pour into the free central space cream of a different flavor—say strawberry—to fill said space partly or entirely. The cup being again closed, the machine is brought back to the position shown in the drawings, and the receptacle is rocked, as before, causing the strawberry cream to form a frozen core if the space was filled with it entirely or another tubular body in case the space was filled only partly. In the latter case a mixture of three distinct flavors, each visibly separated from the others, may be obtained by repeating the operation above set forth.

It will be obvious that the salt and ice cannot get into the cups H. The receptacle and cups can be readily cleaned. The entire construction is simple and inexpensive, yet very efficient.

Having thus described my invention, I claim as new and desire to secure by Letters Patent—

1. A freezer for ice-cream and the like comprising a support with two bearings, a receptacle provided with two heads one of which has a central opening, while the other has a central journal, arranged in one of said bearings, a cover for closing said central opening, a journal projecting from said cover in alinement with the other journal and adapted to be received in the other bearing, means for locking the cover to the receptacle, and a series of cups projecting from the receptacle at that end which has the said cover at the head portion surrounding the cover, said cups extending lengthwise of the axis about which the receptacle is mounted to turn.

2. A freezer for ice-cream and the like, comprising a support provided with two bearings, a receptacle provided with two heads one of which has a central opening and the other a central journal, a cover for said opening provided with a central journal, fastenings for securing said cover to said receptacle and a plurality of cups engaging both heads of said receptacle and individually removable therefrom.

In testimony whereof I have signed my name to this specification in the presence of two subscribing witnesses.

EDWARD RUSSELL MORSE.

Witnesses:
   W. W. BETTS,
   F. DUNCAN.